United States Patent

[11] 3,575,281

| | | |
|---|---|---|
| [72] | Inventor | William M. Sutton<br>Whittier, Calif. |
| [21] | Appl. No. | 782,163 |
| [22] | Filed | Dec. 9, 1968 |
| [45] | Patented | Apr. 20, 1971 |
| [73] | | FMC Corporation, San Jose, Calif. |

[54] SUSPENDED TRAY CONVEYOR
7 Claims, 8 Drawing Figs.

[52] U.S. Cl............................................... 198/158,
198/138, 198/155
[51] Int. Cl............................................... B65g 17/00
[50] Field of Search..................................... 198/138,
157, 157 (A), 158; 214/16.12, 16.12 (B)

[56] References Cited
UNITED STATES PATENTS
2,747,724  5/1956  Kornylak................ 198/155
3,365,052  1/1968  Kornylak................ 198/158
3,405,795  10/1968  Mascherpa............... 198/138

Primary Examiner—Andres H. Nielsen
Attorneys—F. W. Anderson and C. E. Tripp

ABSTRACT: A suspended tray conveyor of the type where load-carrying trays, carried at spaced points on sprocket supported endless chains, are guided by two sets of parallel tracks opposing one another on opposite sides of the elevator housing. On each side, the tracks intersect each other in two places so that the trays may be pivoted from an operative load-carrying position to a folded position. Adjacent the intersection of the tracks the opposing tracks are of different depths and track engaging rollers on the trays are arranged so that by their engagement with the tracks at and adjacent the intersections each tray, as moved along on the conveying chains, is smoothly pivoted between the folded and operative positions.

SUSPENDED TRAY CONVEYOR

BACKGROUND OF THE INVENTION

1. Field of the Invention

This invention relates to vertical material conveyors and more particularly to a suspended tray conveyor in which load-carrying trays or carriers suitable for handling packages and other like articles are positively and continuously guided during their entire cycle of movement up and down within an elevator housing so that they pivot smoothly between operative load-carrying and inoperative positions.

2. Description of the Prior Art

In warehouses, buildings, ships and the like, elevators for conveying materials between the various floors or decks should preferably be confined to a relatively small cross-sectional space to maximize the remaining useful floor or deck area.

In order to minimize the amount of space required, tray elevators that fold the trays to a generally vertical position on the return side of the elevator have been proposed heretofore. Folding tray elevators known in the prior art are susceptible to being damaged as the trays are moved through the elevator cycle. This is because the intersecting guide tracks, normally provided to control the orientation and folding of the trays have, at their points of intersection, gaps where the position of the tray is not positively supported. This can permit the trays to fall until the tray guide rollers are caught in the track segment on the other side of the intersection gap. Although the distance through which the tray is permitted to fall is relatively short, the tracks, the tray, and the tray rollers and other elevator components can be damaged if the track segments on the other side of the gap are not in perfect alignment with the forwarding track segments. Misalignment of the tracks, even if slight, causes an impact to be transmitted to the roller entering the second track segment after it crosses the gap. The impact may cause the track to be bent out of shape, the rollers to be bent or cracked or other damaging action to occur so that the elevator would become inoperative.

SUMMARY OF THE INVENTION

In general the invention relates to a suspended tray conveyor of the type wherein a vertically elongated housing or frame with at least two sides has each side supporting inner and outer guide track means that define elongated closed paths. At least one tray or carrier means supported in said housing on endless chains is provided with rollers for engagement with the guide track means whereby the orientation of the tray is controlled as the chains are driven to move the tray or carrier means up and down within the elongated housing. The inner guide track means on each side of the housing intersects the outer guide track means at two places so that a portion of the inner track lies outside the outer guide track and the tray guide means engaged with the track means causes the tray to move between folded and operative load-carrying positions as the chains propel the tray within the housing. The tray guiding action is particularly effective by reason of means being provided for continuously supporting the tray as it passes through the intersections of the outer and inner tracks on each side of the housing so the tray is not free to fall or be unguided in passing through gaps formed by these intersections.

DESCRIPTION OF A PREFERRED EMBODIMENT

Before describing the novel features of the improved suspended tray conveyor invention, the general features of such a tray elevator conveyor may well be described. Characteristically such a tray conveyor consists of a vertically elongated housing or frame which supports head sprockets at the upper end and foot sprockets at the lower end. A pair of endless chain loops are trained over the respective sprockets at the top and bottom of the housing. The sprockets are suitably driven to move the chains which support trays to receive packages or the like. The movement of the chain loops raises and lowers the trays or carrier means within the housing or frame. The load-carrying trays or other suitable carrier means are pivotally mounted at spaced positions on the chains. The pivotal mounting enables the trays or carrier means to be disposed in an operative load-carrying position or pivoted to a folded position whereat they are generally vertical and have a minimum lateral dimension.

To guide and control the position of the trays or carrier means relative to the chains, the trays have bell crank levers fixedly secured thereto with the fulcrum of the lever being disposed to coincide with the axis of pivotal movement of the tray relative to the chains. The outer ends of the arms of each bell crank lever carry rollers which engage with guide track means secured to the housing or frame of the suspended tray conveyor. Cooperation of the rollers with the guide track means functions to maintain the desired orientation of the trays or carrier means as the chains move the trays or carrier means up and down within the tray elevator conveyor.

Figure 3:
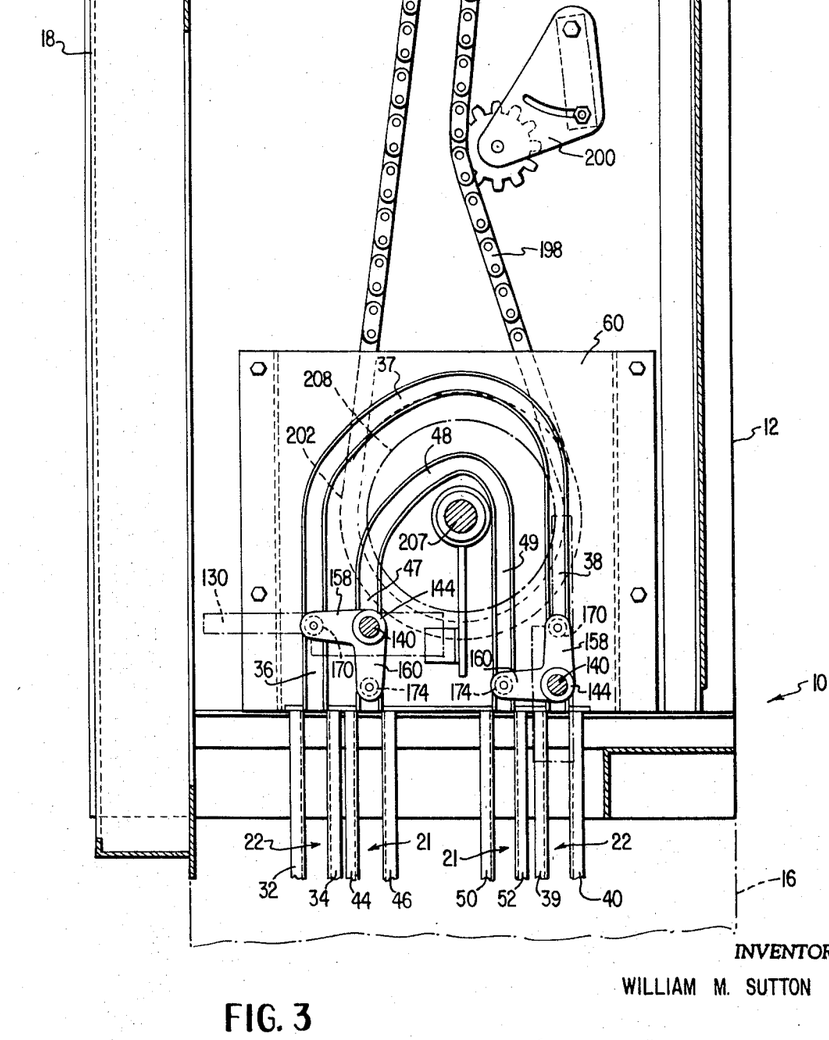
FIG. 3 is a sectional view taken on line 3-3 of FIG. 1 showing the arrangement of the guide tracks in the head section of the unit.
Figure 7:
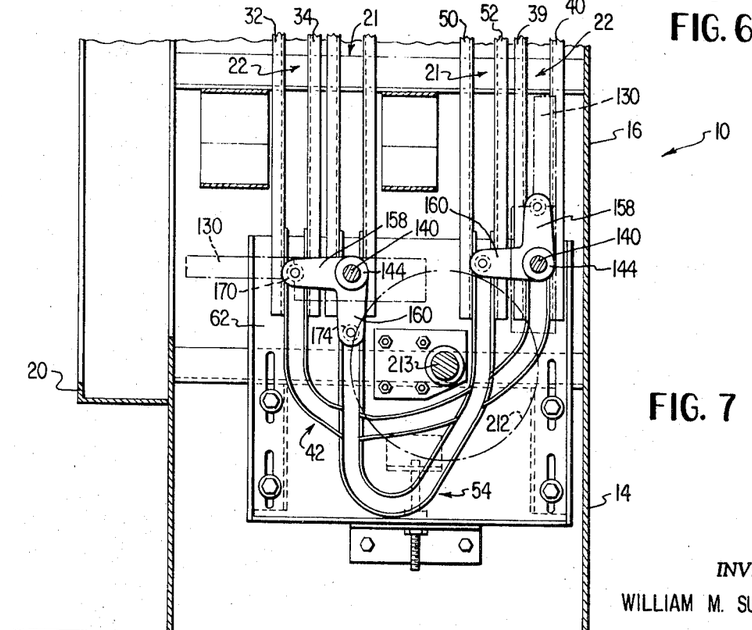
FIG. 7 is a sectional view taken along line 7-7 of FIG. 2 showing the arrangement of the guide tracks and foot sprocket takeup in the lower foot section of the unit.

Referring to FIGS. 3 and 7 which show significant portions of a preferred form of a suspended tray conveyor constructed in accordance with the invention it is seen that the unit includes a vertically elongated housing or frame 10 which comprises an upper head section 12, a lower foot section 14, and an intermediate section 16. Of course the height of the intermediate section 16 may be varied to provide a tray conveyor of the vertical length required for use in the particular building or ship application. Also the intermediate section 16 may consist of several straight housing or frame segments connected in end-to-end relation to provide, with the head section and foot section mounted at the opposite ends thereof, the desired conveyor elevator height.

Figure 1:
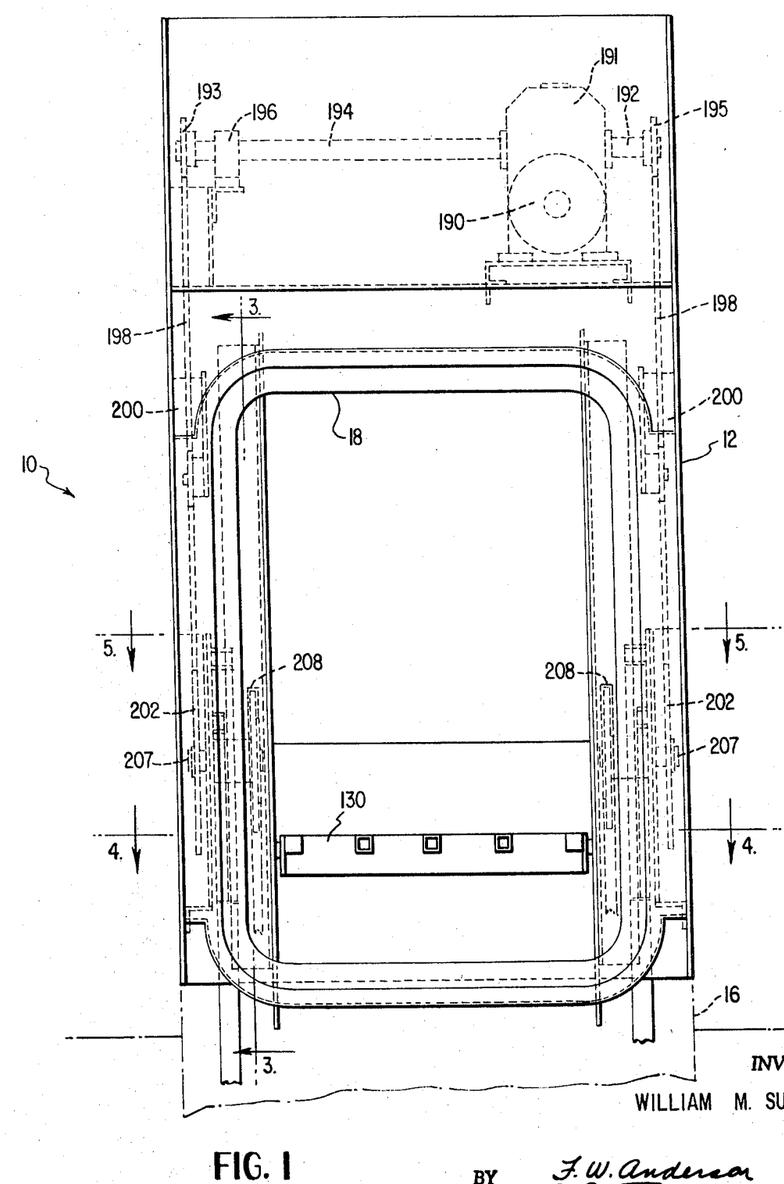
FIG. 1 is a front elevational view of the upper head and drive section of the tray conveyor housing.
Figure 2:
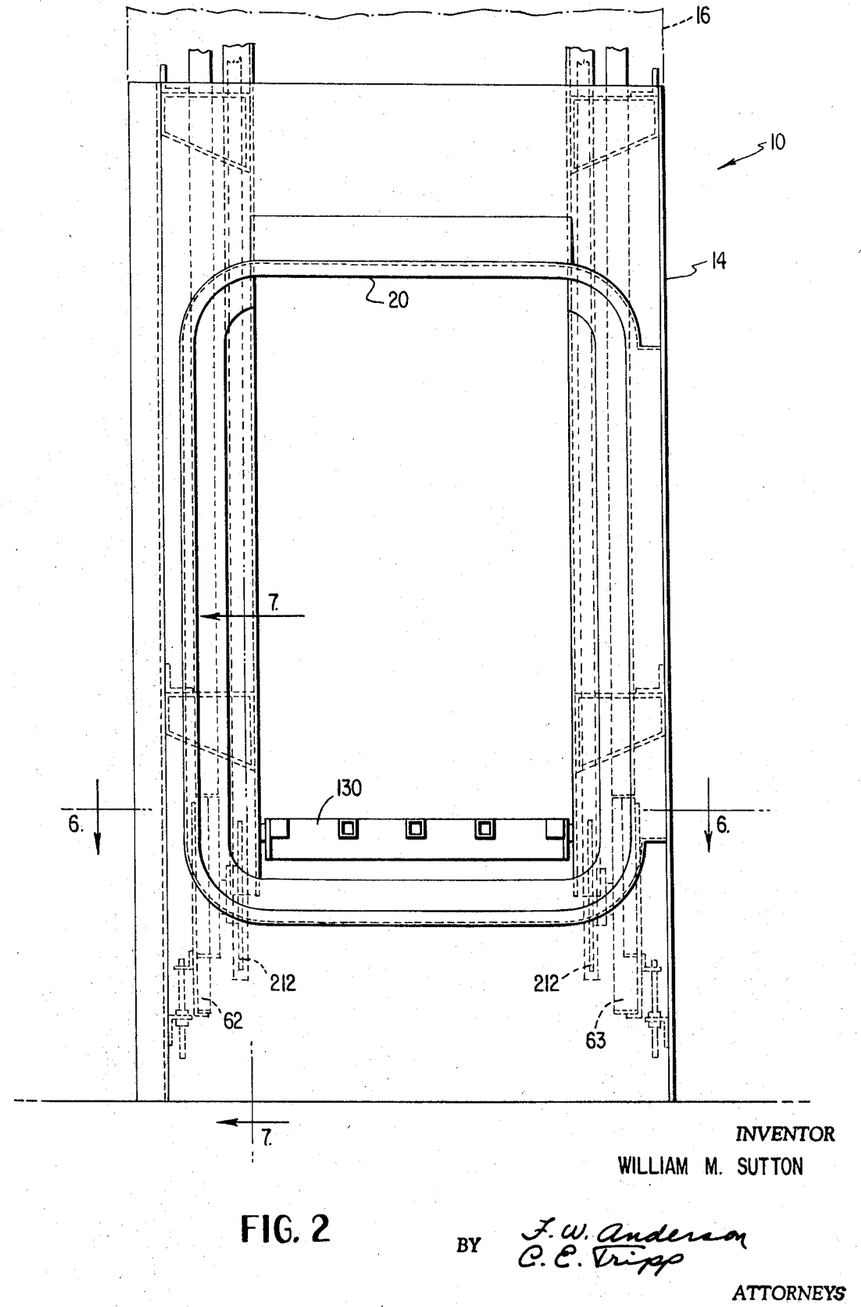
FIG. 2 is a front elevational view of the lower foot section of the tray conveyor housing.

A suitable access to the lower foot section of the housing such as hatch or door 20 (FIGS. 2 and 7) is provided so that trays in that zone may be loaded or unloaded. An access door or hatch 18 (FIGS. 1 and 3) is provided in the upper head section of the housing to permit access to trays in that zone. Similarly, doors or hatches (not shown) may be provided at vertically spaced locations along intermediate section 16 to provide access for loading or unloading the trays or carriers at points along the height of the elevator conveyors.

THE GUIDE TRACKS

The guide tracks for the trays or carrier means can best be described by referring to FIGS. 3 and 7 which show their arrangement on one side of the inner wall of the housing 10. The guide tracks on the upper head section and intermediate section on the opposite side of the housing (not shown) are substantially the same in configuration as those shown in FIGS. 3 and 7 so a description of the guide tracks illustrated in FIGS. 3 and 7 will suffice as a description of the tracks in these sections for both sides of the housing. The guide tracks in the lower foot section are not the same on both sides of the housing. Their differences are illustrated and will be described with reference to FIG. 8.

Figure 4:
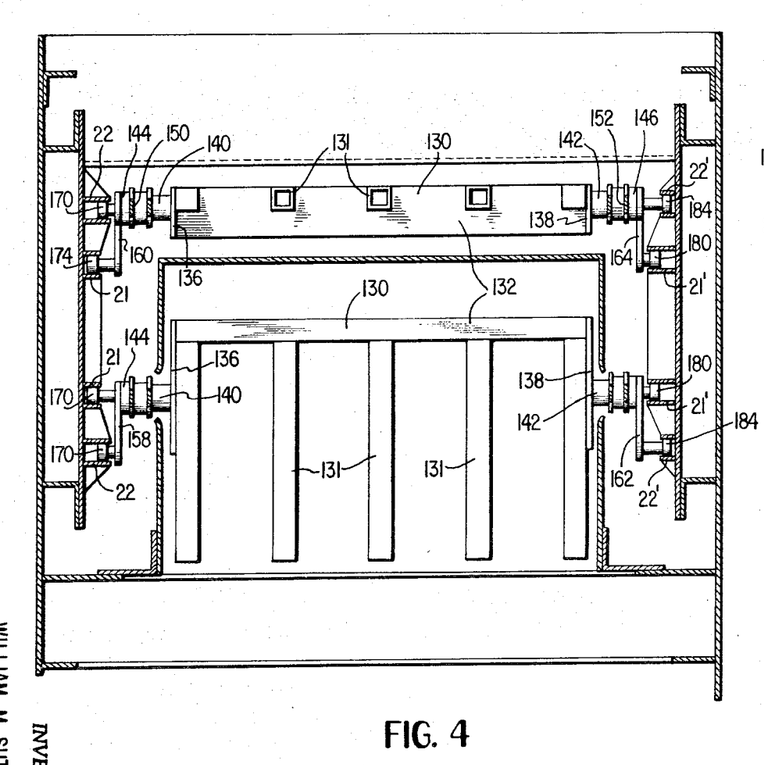
FIG. 4 is a sectional view taken along line 4-4 of FIG. 1 showing the relation of the tray guiding rollers and the guide tracks to the trays supporting chains and housing.
Figure 5:
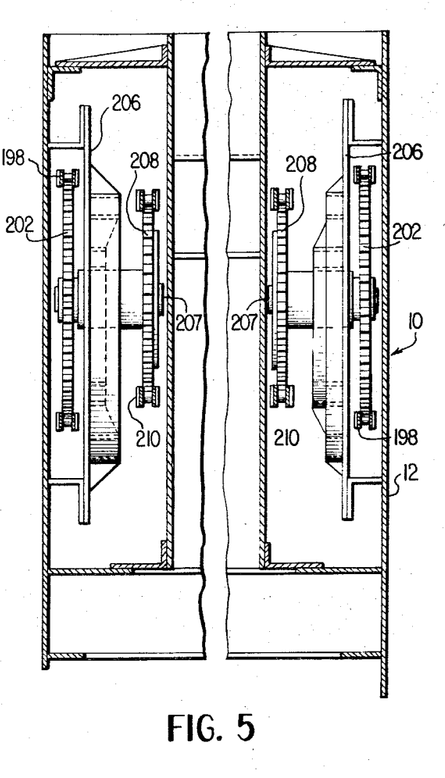
FIG. 5 is a partial sectional view taken along line 5-5 of FIG. 1 showing a portion of the drive system for the tray conveyor.
Figure 6:
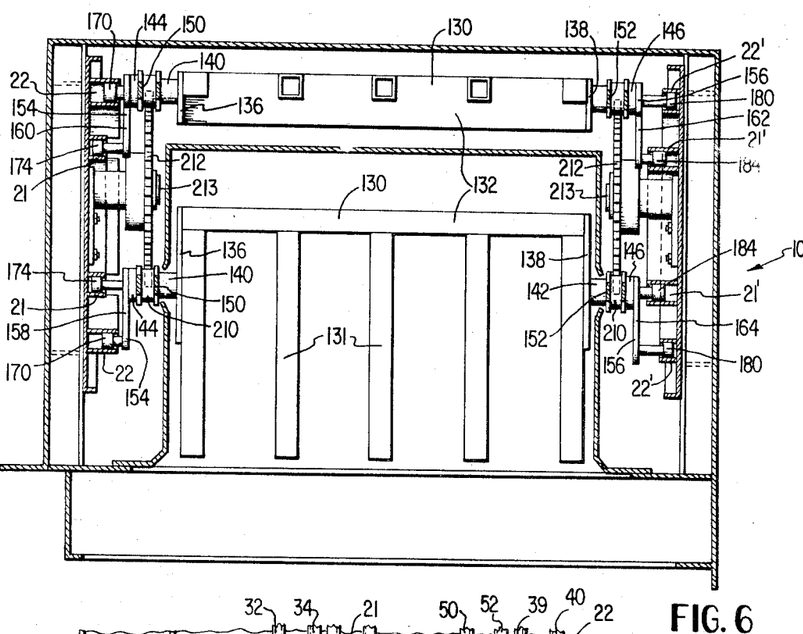
FIG. 6 is a sectional view taken along line 6-6 of FIG. 2 showing the trays and tray guiding rollers in the foot section of the unit.
Figure 8:
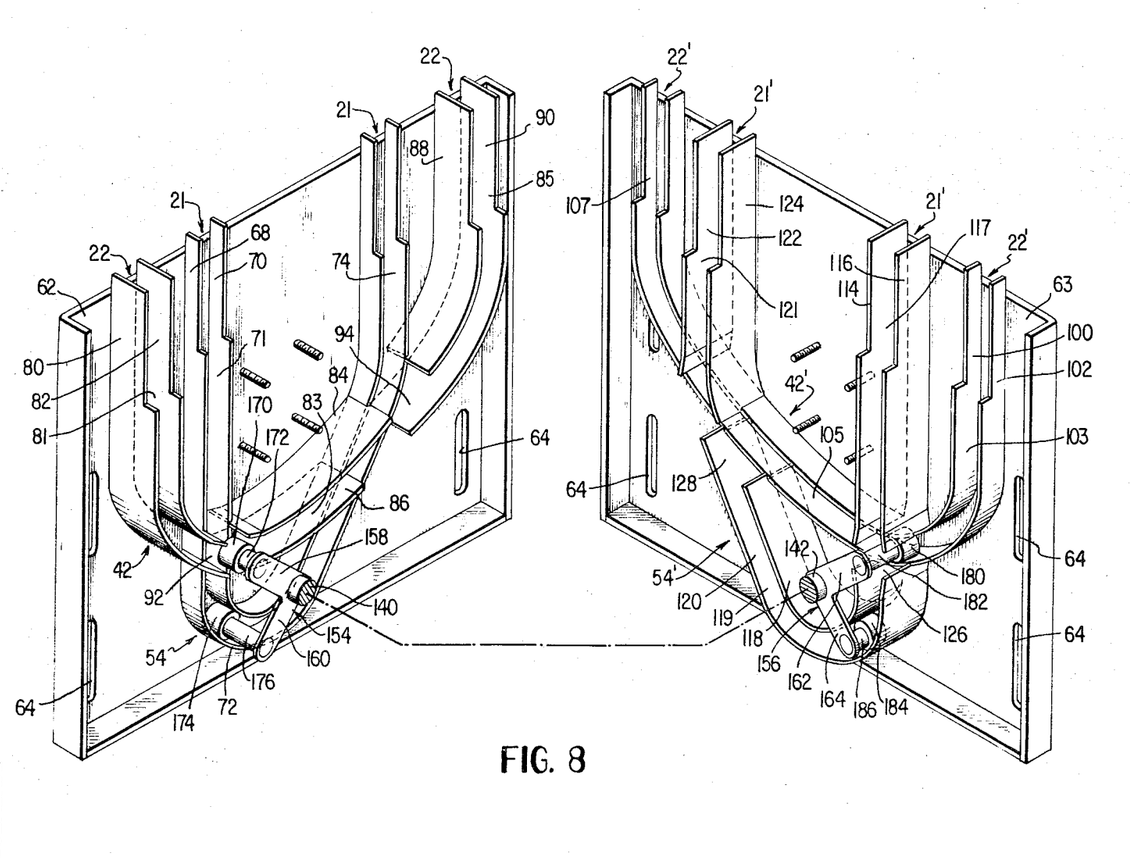
FIG. 8 shows perspectively, views of the lower return segment of the guide tracks as they are related to each other on the opposite sides of the lower foot section of the elevator housing with tray guiding rollers shown as they engage this segment of the guide tracks.

As seen in FIGS. 3 and 7 the guide tracks on the housing side comprise inner tracks 21 and outer tracks 22 which define continuous elongated closed guide circuits. The opposite housing side has similarly formed inner and outer tracks 21' and 22', respectively. The inner tracks on each side are within the outer tracks except in the lower foot section of the housing where they intersect and cross the outer tracks in two places. In the lower foot section 14, and throughout sections 12 and 16, on the one side illustrated in FIG. 3 and FIG. 7 outer track 22 projects inwardly from the housing side a greater distance and thus is deeper than inner track 21 while on the other side of the housing inner track 21' is deeper throughout its length than outer track 22'. This relationship of the tracks in the foot section 14 is best illustrated in FIG. 8, the left perspective thereon showing the housing side seen in FIG. 7. FIGS. 4, 5 and 6 show this depth relationship in section. In the intermediate section 16 of the conveyor housing 10 outer track 22 is shown as being comprised of spaced angle members. Members 32 and 34, forming the operative run for the trays, are spaced to mate with one leg 36 of a generally U-shaped track length 37 (FIG. 3). The other leg 38 of the U-shaped track length 37 merges into the other vertical run of the outer track 22 which is defined by spaced angle members 39 and 40 and which forms the inoperative run for the trays. In the lower foot section 14 of the housing the operative and inoperative runs of the outer track 22 are connected by a lower track length 42 which is of substantially U-shaped configuration and is formed on plate 62 as will be further described.

The intermediate section 16 has the operative run of inner track 21 comprised of spaced angle members 44 and 46. At its upper end it is connected to one leg 47 of a generally U-shaped track length 48. The other leg 49 is connected to the inoperative run of the track 21 which is defined by members 50 and 52. In the lower foot section 14 of the tray elevator the operative and inoperative runs of the inner tracks 21 are connected by a lower track length 54 which is U-shaped and extends below the track length 42 of the outer track 22.

The track lengths 37 and 48 in head section 12 are mounted on a suitable plate 60, while the lower track lengths 42 and 54 are mounted on a plate 62. On the opposite side in the lower foot sections 14 the U-shaped track lengths 42' and 54' (FIG. 8) are mounted on a plate 63. Both plates 62 and 63 are provided with adjustment holes 64 and when mounted on the sides of housing 10 in foot section 14 they each are adjustable through a threaded takeup mechanism to appropriately tension the tray carrying chains.

As explained above, the head and intermediate sections have tracks which are similar in configuration on both the left- and right-hand sides of the tray elevator conveyor although of different depths. Thus in these sections the inner tracks 21 and 21' and the outer tracks 22 and 22' are directly opposed and aligned opposite one another on the facing sides of housing 10. On the other hand, the inner and outer tracks in the foot section 14 are uniquely formed as illustrated in FIG. 8.

In the embodiment illustrated, plate 62 supports the inner track 21 which is comprised of two spaced strips 68 and 70 secured on edge to the plate. The strips 68 and 70 form a first straight segment 71 that merges into a generally U-shaped segment 72 which curves upwardly to a third track segment 74. Plate 62 also supports the outer track 22 which is formed by elongated strips 80 and 82 mounted on their edges in spaced parallel relation. The aforementioned strips are wider than strips 68 and 70 forming the outer track return section so track 22 on this side of the housing is deeper than inner track 21 on the same side.

The outer track 22 in foot section 14 consists of three segments. Segment 81 is defined by strips 80 and 82. Its lower end is curved inwardly to terminate at strip 68 of the inner track 21. Intermediate segment 83 has a generally horizontally disposed arc and is formed by strips 84 and 86 which have their ends in alignment with the ends of strips 80 and 82 of the first segment 81. The third segment 85 which is defined by strips 88 and 90 has one of its ends in alignment with segment 83 and has its other end directed upwardly to merge into the inoperative run of the outer track 22 in the intermediate section 16 of the housing 10. In addition, while the inner track 21 is continuous and of relatively shallow depth, the outer track 22 is deeper and intersected in the two places by track 21, thereby forming a first gap 92 between segments 81 and 83 and a second gap 94 between segments 83 and 85.

Plate 63 which is in the lower foot section of the housing 10 in opposed relation to plate 62 supports the lower return portions of inner track 21' and outer track 22'. On this side of the housing the outer track 22' is illustrated as being formed by two elongated strips 100 and 102 secured on edge to plate 63. The strips 100 and 102 form a first straight segment 103 that curves into a segment 105 which has a generally horizontally disposed arc. Segment 105 in turn curves into an upwardly directed segment 107 which is aligned with the inoperative run of the outer track 22' in the intermediate section 16 of housing 10.

The return portion of inner track 21' is comprised of three segments. A first downwardly directed track segment 117, formed by spaced parallel strips 114 and 116 which are secured on edge to plate 63, terminates at strip 100 of outer track 22'. A second generally U-shaped track segment 119 having one end aligned with the end of first segment 117 is defined by strips 118 and 120. The other end of this track segment is directed upwardly to terminate at strip 102 of outer track 22'. A third track segment 121 consisting of strips 122 and 124 runs from strip 100 of track section 22' upwardly with its lower end in alignment with track segment 119.

On this side of the housing inner track 21' is deeper than outer track 22', opposite to the respective depths of tracks 21 and 22 on the opposing ride of the housing. Therefore the strips that define inner track 21' extend further inwardly from the plate 63 than do the strips forming track 22'. Where the inner track 21' is intersected by outer track 22' a first gap 126 on the operative run is formed between segments 117 and 119 and a second gap 128 on the inoperative run is formed between segments 119 and 121.

In summary, on the left-hand side of housing 10, outer track 22 is substantially deeper than inner track 21 while on the right-hand side inner track section 21' is substantially deeper than outer track section 22'. In addition on the left-hand side the inner track 21 in foot section 14 is continuous and the outer track 22 is intersected while on the right-hand side the outer track 22' is continuous while the inner track 21' is intersected. In outer words, the deeper track on either side is twice intercepted and interrupted by the shallower track on that side.

THE TRAYS

The construction of the tray or carrier means utilized in the subject invention can best be described by reference to FIGS. 3, 4, 6, 7, and 8. The load-carrying trays 130, which extend substantially the width of the interior of the housing, have plates 136 and 138 suitably fastened to their sides (FIGS. 6). The trays are illustrated as formed of a series of parallel bars 131 fastened to and extending from rectangular tubing 132. The plates 136 and 138 support outwardly projecting stub shafts 140 and 142 which are journaled in bushings 144 and 146, respectively. The bushings 144 and 146 are carried in chain links 150 and 152 which are connected into chains 210. These sprocket chains 210 support and move the trays through housing 10 with trays 130 rotatably supported on spaced chain links 150 and 152.

Bell cranks 154 and 156 are rigidly secured to the outermost ends of stub shafts 140 and 142, respectively, outboard of chain links 150 and 152 in chains 210. Bell crank 154 includes a support arm 158 in alignment with the load supporting bars 131 of tray 130 and a guide arm 160 disposed at right angles to arm 158. Bell crank 156 has a support arm 162 in alignment with the bars 131 of tray 130 and a guide arm 164 disposed at right angles to the support arm 162.

Referring to FIGS. 6 and 8, support arm 158 on bell crank 154 carries at its outer end a relatively short shaft 172 rotatably supporting a roller 170 which is adapted to travel along guide track 22 that project inwardly of guide track 21. At its end guide arm 160 rotatably supports a roller 174 on an elongated shaft 176, such roller engaging in guide track 21. Bell crank 156 has a roller 180 to travel along outer track 22' rotatably mounted on an elongated shaft 182 which is supported at the end of support arm 162. At its end, guide arm 164 supports a relatively short shaft 186 carrying a roller 184 to travel along inner track 21'.

DRIVE SYSTEM

The trays 130 are moved in their vertically elongated continuous path as defined by the travel of endless chains 210. A suitable motor 190 (FIG. 1) mounted in the head section 12 of the elevator housing 10 is coupled through a gear-reducer 191 to drive laterally extending shafts 192 and 194 projecting from each side of the gear-reducer. Shaft 194 is supported at its outer end by a suitable bearing 196 and has a sprocket 193 mounted at its end. A similar sprocket 195 is fixed to the end of shaft 192. As best seen in FIG. 5, frame members 206 on each side of the housing 10 in the head section 12 rotatably support a pair of axially aligned shafts 207. A driven sprocket 202 is fixed to each shaft 207 on the outboard side of the frame members 206. Sprockets 208 for tray supporting chains 210 are fixed to the inboard side of shafts 207. A drive chain 198 is trained around sprocket 193 and one driven sprocket 202. Similarly, on the other side of the housing a drive chain 198 is trained around sprocket 195 and the other driven sprocket 202. Thus, motor 190 will operate to drive both of the sprockets 208 and in turn the chains 210 which carry trays 130. Each of the drive chains 198 has a suitable tension adjuster 200 mounted on the housing 10. Lower sprockets 212 are rotatably mounted on shafts 213 in the foot section of the housing in vertical alignment with upper sprockets 208. These lower sprockets and their mounting shafts are supported on plates 62 and 63 to be adjustable in obtaining proper tensioning of chains 210. Suitable sprocket chains 210 with a plurality of tray supporting links 150 and 152 at regular spaced intervals are drivingly entrained about each upper sprocket 208 and lower sprocket 212.

OPERATION

When the tray elevator conveyor is operated by motor 190 sprocket chains 210 and the trays associated therewith move about and between the upper and lower sprockets in a continuous vertically elongated path. The spacing between the inner and outer tracks 21–21' and 22–22' on opposite sides of housing 10 is equal to the length of the support and guide arms on the bell cranks 154 and 156, this spacial distance being represented by the distance between the axis of the roller on the bell crank arm and the axis of the stub shaft which is mounted on the load-carrying tray. Also, as best seen in FIGS. 3 and 7, the center lines of the guide tracks 22 and 22' along the rear or inoperative runs of the elevator conveyor lie in a plane which intersects or is tangent to the pitch diameter of the upper and lower sprockets 208 and 212. Similarly the center lines of guide tracks 21 and 21' along the front or operative run of the conveyor lie in a plane which intersects or is tangent to the pitch diameter of the upper and lower sprockets 208 and 212.

With these relationships between the sprockets which define the path for the tray carrying chains 210 and the guide tracks, each tray assumes a folded or generally vertical inoperative position as the tray moves along the inoperative run of the tray elevator conveyor. In this state the support arms 158 and 162 of the bell cranks 154 and 156, respectively, as guided by rollers 170 and 180 in tracks 22 and 22' are aligned in a plane including the path of movement of the chains 210 while the guide arms 160 and 164 of the bell cranks which carry rollers 174 and 184 extend perpendicular to such plane. As the tray travels up into the upper head section 12 of housing 10 the relation of the tracks to the path of movement to the chains 210 changes to the point that the rollers 174 and 184 and guide arms 160 and 164 which carry them become aligned in a plane which includes the path of movement of the chains 210. In this condition, the support arms 158 and 162 extend perpendicular to such plane. This relationship is assumed in the operative run of the elevator conveyor wherein the tray 130 is maintained in a generally horizontal position to carry the desired load.

In FIG. 3, one tray is illustrated in phantom in its folded position in the inoperative run of the conveyor and another tray is shown in its load receiving position in the operative run of the tray elevator conveyor.

As each tray, carried on chains 210, enters the lower foot section 14 from the operative run of the conveyor, roller 170 is in guiding engagement with outer track 22 while roller 174 on guide arm 160 is engaged with inner track 21 to hold the tray in its load-carrying position. At the opposite side of the tray, roller 180 on support arm 162 of bell crank 156 is in engagement with outer track 22' while roller 184 on guide arm 164 is guidingly engaged with inner track 21'.

At the first intersection of the inner and outer tracks in the foot section 12, roller 184 enters gap 126 and thus becomes free of track guidance. However, at this point roller 174 on the opposite side of the tray remains guided and controlled in the first segment 71 of inner track 21 and likewise rollers 170 and 180 remain under controlled guidance in the segments 81 and 103 of the outer tracks 22 and 22', respectively. Thus the tray's orientation remains controlled by the three rollers 170, 174 and 180.

As the chains 210 carry the tray further through the foot section 14, the position shown for the rollers and the tray in FIG. 8 is reached. Roller 184 has passed through gap 126 into segment 119 of inner track 21' to again be under track guidance. Roller 180 remains under the guidance of the continuous outer track 22' as does roller 174 with respect to continuous inner track 21 on the opposite side of the foot section. Roller 170 is moved from its guided position in segment 81 of outer track 22 into gap 92 where it is free of track guidance but the tray orientation is still controlled by the track guidance of rollers 174, 180 and 184.

The relation of the track paths in the foot section 14 relative to the path of movement of the tray carrying chains 210, as determined by the position of sprockets 212, causes the bell cranks 154 and 156, and in turn the tray 130 carried thereby, to be pivoted through approximately 90° whereat the tray is in its folded position preparatory to moving up along the inoperative run of the conveyor.

When the tray approaches the second intersection of the inner and outer tracks in the foot section 14, rollers 174 and 180 on opposite sides of the tray remain under the continuous guidance of the inner track 21 and outer track 22', respectively. When roller 170 enters gap 94 to become free and unguided, roller 184 is still in track segment 119 of inner track 21' so that the position of the tray remains controlled by the track guidance of rollers 174, 180 and 184. Thereafter roller 170 enters track segment 85 of outer track 22 to again come under track guidance. When roller 184 on the opposite side of the tray enters gap 128, at such point the tray position or orientation is still positively controlled by reason of the other three rollers 170, 174 and 184 remaining under track guidance.

Although the description hereinabove has made reference to movements of a tray as the tray moves downwardly in the operative run and upwardly in the inoperative run of the tray elevator conveyor, it will be readily apparent that reverse driving of the upper chain sprockets 212 and in turn chains 210 carrying the trays 130 will create opposite pivoting of the trays between folded and operative positions in the head and foot sections from that heretofore described. Thus by merely changing the operating direction of motor 190, which drives chains 210, the tray elevator conveyor may be used to elevate packages, articles or the like or lower such loads as may be desired.

When rollers 170 and 184 cross gaps 92, 94, 126 and 128 by reason of their being mounted on relatively short shafts so that they travel along the inner edges of the deeper outer track 22 and inner track 21' they pass over the strips forming the shallower but continuous inner track 21 and outer track 22'. On the other hand, rollers 174 and 180 which are on relatively long shafts 176 and 182, are in continuous engagement with the shallower inner track 21 and outer track 22'. Therefore at least three of the rollers 174, 180, 170 and 184, are always in engagement with the guide tracks to positively and continuously support the tray to prevent it from falling as it passes through the intersection of the inner and outer tracks.

Thus, a tray elevator conveyor is presented in which the trays are folded into a vertical position as they enter the inoperative run of the elevator conveyor and in which the trays are unfolded in the operative run to present supporting surfaces. Also during the folding sequence in the lower foot section of the elevator conveyor the trays are continuously and positively supported and guided by the tracks so they will not be damaged or cause damage to the rollers, guide tracks or other parts.

It is, of course, within the scope of the present invention to provide a crossover arrangement at the upper end of the housing as well as at the lower end.

While the invention has been described with reference to a particular embodiment thereof, it is to be understood that it is intended to cover the many modifications and variations of this invention that would be obvious to a person skilled in the art. It is therefore to be understood that the invention is not to be limited by the disclosure of the particular embodiment herein but rather by the scope of the claims appended hereto.

I claim:

1. A tray elevator conveyor of the type embodying a series of load carriers mounted on endless flexible conveying elements which are driven to move said carriers through an elongated path within a support structure having opposed sides and having means for guiding orientation of said carriers throughout their movement along said path comprised of inner and outer guide tracks on each of the opposed sides of the structure and guide members associated with each load carrier guidingly engaged with each of said tracks, said inner guide track on each of said sides intersecting said outer track so that a portion of said inner track lies outside said outer track to cause said carriers to move between load-carrying and folded positions the improvement comprising: said outer guide track on one of said sides and said inner guide track on the other of said sides being discontinuous at said intersections; said inner guide track on said one side and said outer guide track on said other side being continuous at said intersections; and said guide members being formed to remain in operative engagement with both of said continuous guide tracks and with one of said discontinuous guide tracks at said intersections to control the orientation of said carriers as they move past said intersections.

2. A tray elevator conveyor as defined in claim 1 wherein: said continuous guide tracks define first bearing surfaces; said discontinuous guide tracks project inwardly a greater distance than said continuous guide tracks to define second bearing surfaces inwardly of said first bearing surfaces; and said guide members engageable with said first and second bearing surfaces.

3. A tray elevator conveyor as defined in claim 2 wherein: said guide members comprise a pair of outwardly projecting rollers on each side of each of said load carriers; and one of said rollers on each of said sides engages said first bearing surfaces and said other roller on each of said sides engages said second bearing surfaces.

4. A tray elevator conveyor as defined in claim 3 wherein: each pair of said rollers is mounted on a bell crank having a first arm rotatably supporting one of the pair of rollers and a second arm disposed in fixed angular relation to said first arm carrying the other of the pair of rollers, said roller on said second arm on said one side of said tray and said roller on said first arm on said other side of said tray projecting outwardly a greater distance than the other roller on each side so that said first mentioned rollers engage said first bearing surfaces and said other rollers engage said second bearing surfaces.

5. A tray elevator conveyor as defined in claim 4 wherein said carriers are each in the form of a tray; and said first arm of each bell crank associated with each tray lies generally in the plane of each tray and said second arm of such hold crank extends approximately 90° to the first arm.

6. A conveyor of the type embodying a series of load carriers mounted on endless flexible conveying elements which are driven to move the carriers through an elongated path on a support structure having opposed sides and having means for orienting the carriers throughout their movement along said path comprised of inner and outer guide tracks on each of the opposed sides of the structure and guide members having track engaging components at each side of the carriers operably engaged at portions of said path with the tracks to control the orientation of the carriers, the inner guide track on one side of the structure intersecting the outer guide track at a point directly opposite the point of intersection of the inner and outer tracks on the other side, so that a portion of the inner track lies outside the outer track, said tracks being constructed at the intersection of the tracks on one side of the structure for retaining control of the track engaging components on one side of the carriers and constructed at the intersection on the opposite side for simultaneously releasing the control of at least one track engaging component on the other side of the carriers the intersection of said tracks on one side of the structure for retaining control of the guide members and means at the opposite intersection for simultaneously releasing the control of at least one guide member at the other side of the load carrier.

7. A tray conveyor according to claim 6 wherein the guide members at each side of the carriers are bell cranks.

PO-1050
(5/69)

UNITED STATES PATENT OFFICE
CERTIFICATE OF CORRECTION

Patent No. 3,575,281          Dated April 20, 1971

Inventor(s) WILLIAM M. SUTTON

It is certified that error appears in the above-identified patent and that said Letters Patent are hereby corrected as shown below:

| | | |
|---|---|---|
| Column 4, line 67: | | change "FIGS." to --FIG.--. |
| Column 8, line 54: | | after "carriers" insert a period; |
| | line 54: | delete "the intersection of said tracks on one"; |
| | lines 55-58: | delete these lines. |

Signed and sealed this 22nd day of February 1972.

(SEAL)
Attest:

EDWARD M. FLETCHER, JR.          ROBERT GOTTSCHALK
Attesting Officer                 Commissioner of Patents